Sept. 23, 1941.   R. W. BROWN   2,256,824
CLAMP APPLYING TOOL
Filed Jan. 9, 1940
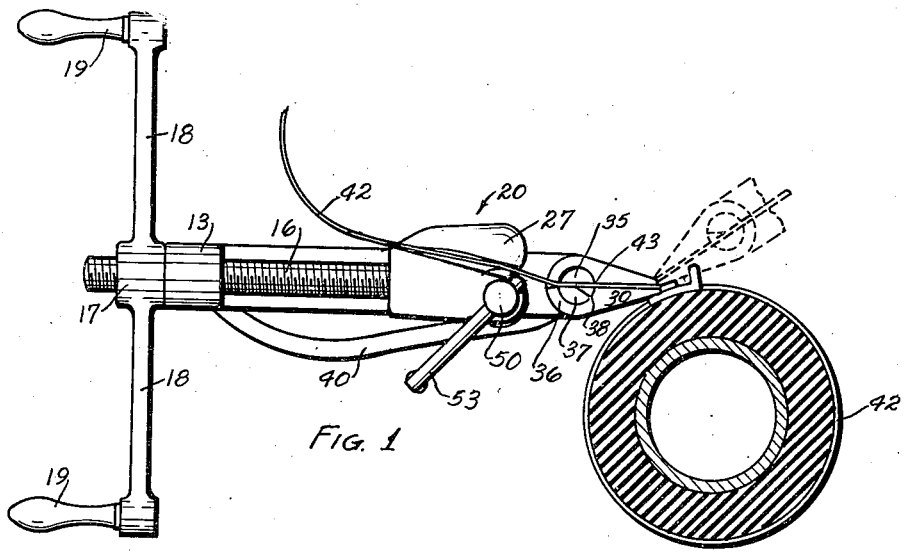
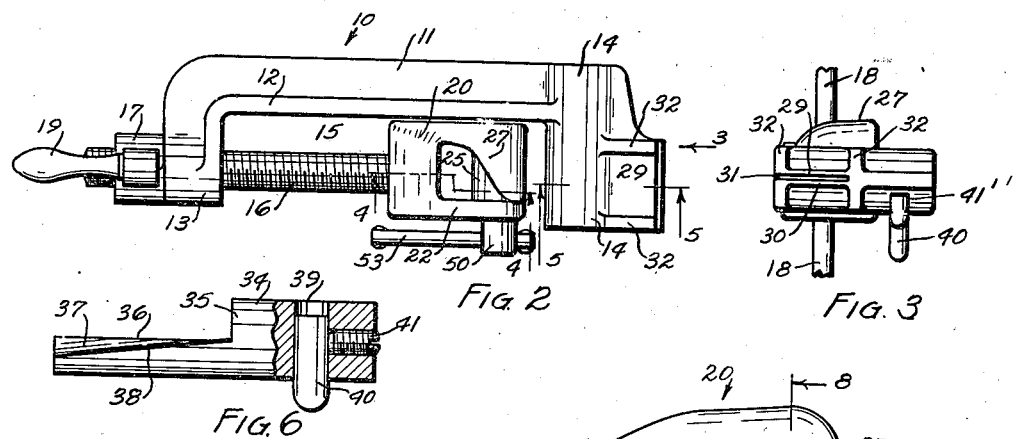
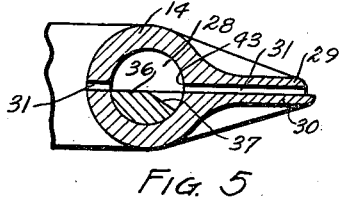
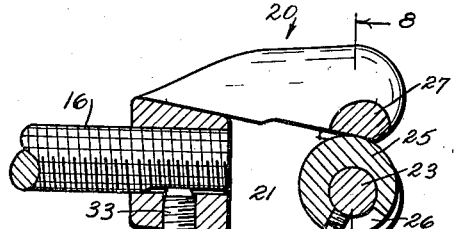
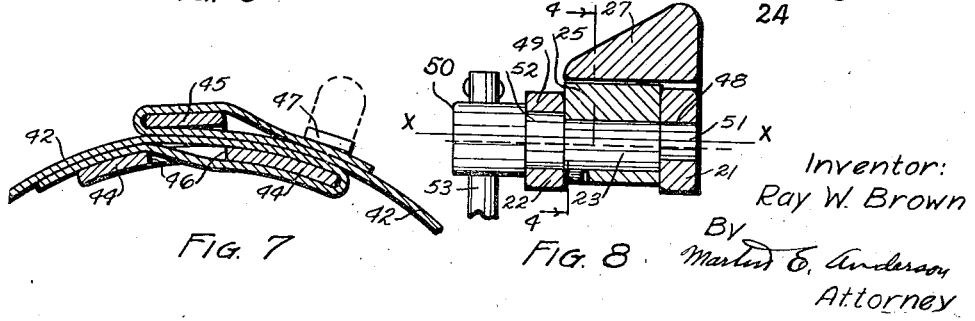
Inventor:
Ray W. Brown
By Martin E. Anderson
Attorney Patented Sept. 23, 1941

2,256,824

UNITED STATES PATENT OFFICE 2,256,824

CLAMP APPLYING TOOL

Ray W. Brown, Denver, Colo., assignor to Band-It Company, Denver, Colo., a corporation of Colorado Application January 9, 1940, Serial No. 313,029

1 Claim. (Cl. 81—9.3)

This invention relates to improvements in band or strap stretching devices and has reference more particularly to a device designed more especially for applying clamps to steam and compressed air hose, but which can also be employed wherever it is necessary or desirable to apply and tighten a band to any article.

It is frequently necessary to employ compressed air and steam under high pressures and for this purpose rubber hose is frequently employed for portions of the conduit. Wherever two sections of hose are to be connected to each other, or wherever a hose is to be connected to a metal pipe, it is necessary to encircle the hose with a strong metal band and to tighten the latter so as to force the inner surface of the hose against the pipe or tubular coupling with sufficient pressure to prevent the fluid transported by the hose from leaking. For the purpose of applying tight clamps to steam and compressed air hose and hose used for any other fluid under pressure, many different tools have been invented and marketed.

It is the object of this invention to produce an improved tool for applying such clamping bands to any article which tool shall be so constructed that it is capable of exerting a powerful tension and of bending the band around an anchor, cutting the band at the proper position and readily clamping and releasing the band which is to be applied by means of this tool.

One object of this invention is to provide a band stretching device or clamp applying tool which shall be so constructed that the band can be inserted later so as to make it unnecessary to cut the bands to a predetermined length before they are applied.

Another object is to provide a tool of the kind described which shall be provided with a rotary shear by means of which the band can be readily cut to the proper length, after it has been tightened.

A still further object of this invention is to provide a clamping device of such construction that it will have a cam action and will at the same time permit the clamp to be released without necessitating relative rotary movement between the outer cam surface and the strap.

Another object is to provide a band stretching device which can be readily taken apart so as to enable it to be packed in a comparatively small box and to be readily assembled for use whenever needed.

The above and other objects that may appear as this description proceeds are attained by means of a construction and an arrangement of parts that will now be described in detail and for this purpose reference will be had to the accompanying drawing in which the invention has been illustrated in its preferred form, and in which:

Figure 1 is a side elevation of the tool showing the same in the position it occupies when employed for the purpose of applying a band to a rubber hose, the position of the tool after the desired tension has been attained and before the band is sheared being shown by dotted lines;

Figure 2 is a top plan view of the tool shown in Figure 1;

Figure 3 is an end elevation looking in the direction of arrow 3 in Figure 2;

Figure 4 is a section taken on line 4—4, Figure 2;

Figure 5 is a section taken on line 5—5, Figure 2;

Figure 6 is a view partly in elevation and partly in section, of the rotary shear member;

Figure 7 is a longitudinal section through a band and the buckle and illustrates the manner in which the ends of the band are interconnected; and Figure 8 is a section taken on line 8—8, Figure 4, showing the parts to approximately full size.

In the drawing reference numeral 10 designates a frame which is provided with a substantially straight portion 11 of T-shaped cross section, the flanges being indicated by reference numerals 12. The frame is provided with two end portions 13 and 14 that extend laterally from the flanged side of the frame member and the adjacent surfaces of these end portions are spaced apart so as to form a notch 15. End portion 13 is provided with an opening through which a threaded bolt 16 extends. This bolt is provided at its outer end with a nut 17 having diametrically extending arms 18 that terminate in handles 19. By means of the arms and handles the nut can be rotated so as to exert a very powerful longitudinal force on the bolt 16. Attached to the other end of the bolt is a head which has been designated in its entirety by reference numeral 20. This head is a steel casting and has spaced arms 21 and 22, which are provided with openings that form bearings for an eccentric 23. One end of the eccentric extends through or projects through arm 22 and is provided with a diametrical opening for the reception of a slidable handle 53 by means of which it can be turned. Mounted for rotation on the eccentric portion 23 is a tubular eccentric 25. One end of the eccentric 25 is provided with a notch or opening 26 in which a set screw that is attached to the cam 23, can move with a lost motion the opening being larger than the pin so that the two eccentrics may have a limited relative rotary movement. When the parts are in the position shown in Figure 4, the eccentric 23 can not be rotated relative to the tubular eccentric 25 while moving in a clockwise direction, but when moved counter-clockwise, eccentric 23 can move until the set screw engages the right hand end of the notch 26. During the movement in a counter-clockwise direction, the tubular eccentric 25 can remain stationary and will be moved away from the clamping jaw surface 27 without rotation about its axes. It will be observed from an inspection of Figure 2 that the clamping jaw surface 27 is a part of the head 20 and consists of a projection portion that extends laterally from the side 21 with which it is integral.

The laterally projecting end portion 14 is provided with a cylindrical opening 28 that extends entirely through the same. Extending from one side of the circular portion of member 14 is a nose comprising two thin parts 29 and 30 that are separated by a slot 31. This slot extends entirely across the end portion 14 and is preferably so positioned that it lies in a plane which passes through the center of opening 28. It will be observed that the projection 30 extends a short distance beyond the corresponding projection 29 for the purpose of facilitating its engagement with a stop as will more clearly appear as the description proceeds.

Strengthening ribs 32 are provided for the purpose of reenforcing the projections 29 and 30. Bolt 16 is preferably threadedly connected with the head 20 and is held against rotation by means of a set screw 33 in the manner shown in Figure 4. It is evident that whenever the nut 17 is rotated in such a way as to move the bolt towards the left when viewed as in Figures 1 and 2, the head 20 will move away from the end member 14.

Positioned in the opening 28 is a rotary shear member 34 which has been shown partly in elevation and partly in section in Figure 6. This shear member has a cylindrical portion extending inwardly from one end thereof and terminating at line 35. The portion to the left of line 35 is slightly less than semi-cylindrical and has a portion 36 of its upper surface in a chordal plane. The other part of the upper surface is formed by a helical surface 37 which intersects the cylindrical surface along line 38. Shear member 34 is provided near one end with a diametrical opening 39 for the reception of one end of the handle 40 which is held in place therein by means of a set screw 41 in the manner shown in Figure 6. The handle extends through an arcuate slot which has been designated by reference numeral 41', Figure 3, and the handle 40 is preferably curved in the manner shown in Figure 1 and when in that position a band 42 can be introduced laterally into slot 31 so as to occupy the position shown in Figure 1. When in this position the chordal surface 36 is parallel with one side of the band and the helical surface 37 is angularly inclined thereto in the manner shown in Figure 1. If handle 40 is turned in a counter clockwise direction from that shown in Figure 1, it will rotate the shear member 34 and the cutting edge 38 of the latter will shear the band due to this rotation. Since the cutting edge is helical, the shearing will take place from one edge of the band and progress transversely thereof as is customary in properly designed shearing mechanisms. The corner 43 serves as a shear edge with which the edge 38 cooperates to effect the shearing operation.

In order to employ this device for the purpose of applying a band to a hose or any other object, a connector which is usually referred to as a buckle, is employed. This buckle has been shown in cross section in Figure 7 and consists of a sheet metal plate 44 from which an anchor section 45 has been cut by means which shears it along the lines 46 and then offset into a plane spaced from the plate 44. The offset portion 45 will be referred to as an anchor. One of the end portions 44 is provided with two clamping tongues 47 which normally project upwardly in the manner indicated by dotted lines in Figure 7, but which can be turned down into the full line position as shown. When a band is to be applied to a hose, one end thereof is placed between the anchor 45 and the tops of both portions 44 and is then bent rearwardly passing underneath one portion 44, thence upwardly through the opening provided by the displacement of anchor 45 and thence over the other portion 44 as clearly shown in Figure 7. The band is then placed around the hose or other object and underneath the anchor 45, thence through the slot 31 and between the clamping surface 27 and the eccentric 25. The eccentric is now turned until the band is forced against the clamping surface, whereupon the nut 17 can be rotated so as to move the bolt 16 towards the left in such a manner as to tighten the band. It will be seen that the jaw member 30 engages the anchor which forms an abutment and it is therefore possible to exert a powerful tension upon the band by rotating the nut. After the band has been tensioned to the extent desired, the tool is rotated from the full line position to the dotted line position shown in Figure 1, after which handle 40 is moved in a counter clockwise direction, whereupon the band is sheared. The tool can now be withdrawn from the end of the band but during this operation care should be taken to exert pressure on the free end so as to prevent it from straightening and releasing the tension. As the tool is withdrawn the operator's finger can be placed on the cut end which is bent into position between the tongues 47 and the latter are then turned inwardly and pressed downwardly so as to anchor the cut end and hold the parts in the manner shown in Figure 7.

It will be observed that with the arrangement illustrated and described, the buckle is subjected to compressive strains instead of tensional strains, thereby greatly increasing its power of resistance.

One of the important features of the present construction relates to the specific means employed for clamping the band to the head 20 and this will now be described. The arms 21 and 22 are provided with bearings 48 and 29 respectively, which bearings are in axial alignment but of different diameters, bearing 48 being the smaller.

A rotatable pin 50 is mounted for rotation in bearings 48 and 49 and has two cylindrical surfaces 51 and 52 that are of different diameters, but concentric, and which are journaled respectively in bearings 48 and 49. The axes about which pin 50 rotates has been designated by x—x and is shown by a full line. The surface marked 23 is eccentric with respect to the journals 51 and 52, its center axis being indicated by a dotted line. The tubular eccentric 25 is mounted for limited rotation on the cylindrical eccentric surface 23; the relative rotation being limited by notch 26 and pin 24. After the band has been inserted into the space between the tubular eccentric and the clamping surface of part 27, the operator grasps handle 53 and turns pin 50 clockwise when viewed as in Figure 1. Due to friction and other causes, the tubular eccentric will turn with pin 50 until its surface comes into engagement with the under surface of the band 43, whereupon it stops rotating. Pin 50 is now rotated further and, due to its eccentricity, it forces the tubular eccentric against the under surface of the band. Since the eccentricity of part 23 is small it can exert a powerful force for urging the tubular eccentric against the under side of the band. When the band is put under tension it exerts a force which tends to rotate the tubular eccentric, but due to the eccentricity of the latter, it cannot turn and such force therefore merely tends to clamp the band tighter. When the band is to be released, pin 50 is turned in the opposite direction and due to the lost motion connection between it and the tubular eccentric the latter is moved away from the clamping surface without rotating relative thereto. When the pin and sleeve reach the limit of the lost motion, the tubular eccentric will be free to rotate. By the means just described, the band can be released while under tension as easily as when there is no tension in the band. A single eccentric is always difficult to release even if there is no tension in the band because the first movement is a rotary movement which requires the parts to slide relative to each other and this is resisted by the friction between the parts. It is evident from the above that the double eccentric construction greatly facilitates the release of the clamping device and obviates the need of set screws that must be adjusted to effect a release as has been suggested by others.

Attention is called to the fact that due to the construction described in which the band 42 can be inserted in the tool by a sidewise motion the band does not have to be cut into appropriate lengths but can be used from the roll and cut after it has been applied to the hose, thereby preventing waste.

Having described the invention what is claimed as new is:

In a strap stretching device having means for engaging a shoulder, a head, and means for moving the head, means for attaching the head to a strap comprising a pin pivotally attached to the head, the head having spaced arms each provided with an opening forming a bearing, the openings being in axial alignment but of different diameters, the pin having two axially aligned cylindrical journals of the proper diameters to fit the bearings, that portion of the pin between said journals being cylindrical and eccentric with respect to the journals, a tubular eccentric carried by the cylindrical eccentric the outer surface of the tubular eccentric being substantially cylindrical, a lost motion connection between the two eccentrics, said connection comprising an opening in one and a cooperating projection on the other eccentric, the opening being larger than the projection, and a clamping jaw, integral with the head, extending over a portion of the surface of the tubular eccentric, said tubular eccentric and jaw being movable into and out of clamping position by a rotary movement of the cylindrical eccentric.

RAY W. BROWN.